United States Patent [19]
Conibear

[11] 3,760,531
[45] Sept. 25, 1973

[54] FRAME FOR ANIMAL TRAP

[76] Inventor: Frank Conibear, 2170 Evergreen Place, Victoria, British Columbia, Canada

[22] Filed: Dec. 15, 1971

[21] Appl. No.: 208,372

[52] U.S. Cl ............................................. 43/90
[51] Int. Cl ...................................... A01m 23/26
[58] Field of Search ......................... 43/88, 90, 92

[56] References Cited
UNITED STATES PATENTS

| | | | |
|---|---|---|---|
| 2,947,107 | 8/1960 | Lehn | 43/92 |
| 1,256,973 | 2/1918 | Bedard et al | 43/92 |

*Primary Examiner* — Warner H. Camp
*Attorney* — Christopher Robinson, et al.

[57] ABSTRACT

An improved frame for a rotating frame animal trap, wherein the upper frame ends are of substantially greater length than the lower ends, permitting more leverage or squeezing power on the jaws of the trap. The sides of each of the frames may be flared away from the axis of rotation, and a downwardly pointing, wedge-shaped space may be incorporated between at least upper portions of co-acting jaws, when closed, to provide a more effective and versatile trap.

7 Claims, 3 Drawing Figures

PATENTED SEP 25 1973          3,760,531
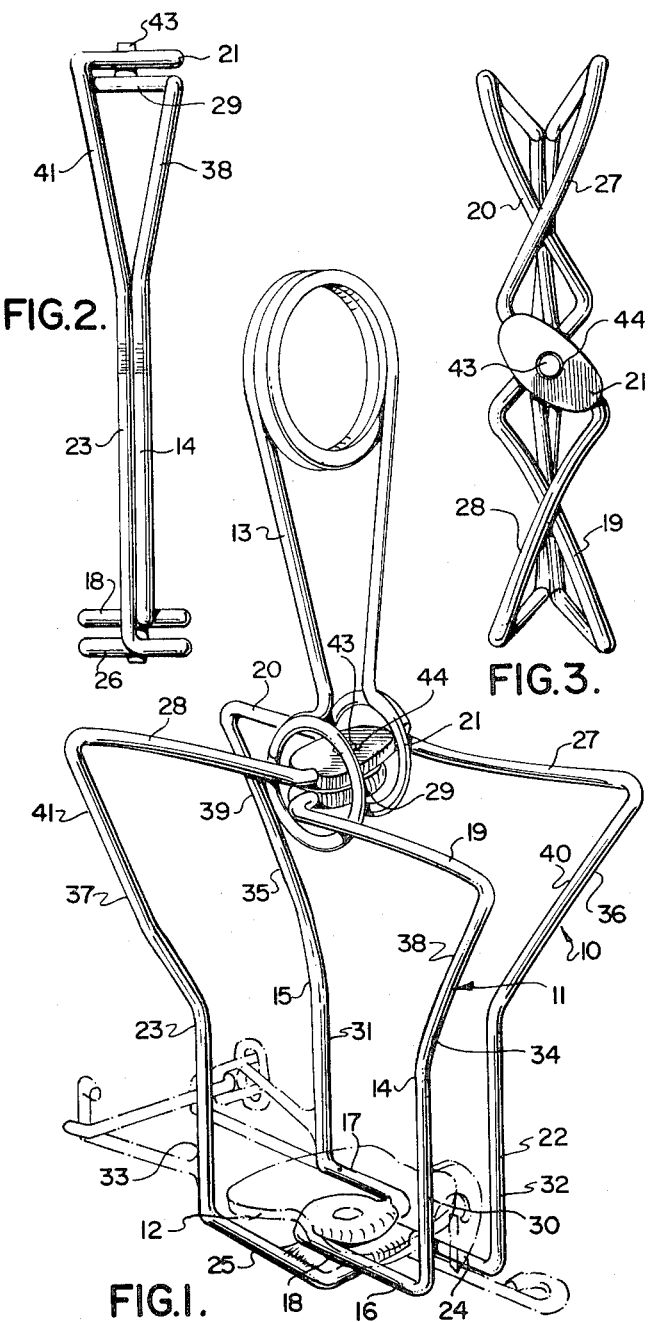

FRAME FOR ANIMAL TRAP

BACKGROUND OF THE INVENTION

This invention relates to improvements in a rotating frame animal trap. More particularly, the present invention relates to improvements in the frame design of the rotating frame type of trap. By a rotating frame animal trap is meant a trap which comprises a pair of similar frames pivotally connected at adjacent ends for relative rotation on a common axis so as to form by their sides two pairs of co-acting jaws. Heretofore, these frames have been substantially square or rectangular in shape. At least one actuator, consisting of a coil spring having arms terminating in closed rings slidable along and encircling one set of adjacent ends of the frames, is used to urge the jaws toward and maintain them in closed position. In my U. S. Pat. No. 3,010,245, dated Nov. 28, 1961, such a rotating frame trap is described in which the ends which co-operate with the rings are shaped so that in the set position of the trap, these ends lie substantially parallel to each other, while the central portions of these ends near the common axis of the frames form a cross with each other within the rings on the arms of the coil spring. A trigger means (for example as described in my above mentioned U. S. Pat. or in Lehn U. S. Pat. No. 2,947,107 dated Aug. 2, 1960), maintains the frames in open position when the trap is set, but when the trap is sprung releases the frames so as to permit, as a result of the action of the spring and rings on the ends, rapid rotation of the frames through an angle of about 90°, so that the jaws quickly strike and kill an animal in the trap.

While some versions of this type of trap have been commercially successful, this trap has been effective against animals of only a narrow range of sizes, depending upon the size of the trap used. For instance a trap with a square frame opening of about 4 ½ inches, when triggered, is designed to catch long-bodied animals such as mink or muskrats, so that at least one set of jaws closes across the animal's neck or chest. But because of the shorter length of the bodies of weasels and squirrels, these animals are often caught in such a trap at the rear portions of their bodies, and death is thereby prolonged.

Another difficulty has been that the rings at the ends of the arms of the actuator have had to be sufficiently large to ensure initial starting power of the trap when the jaws of the trap close from set position. When such large rings are used on known rotating frame traps, the jaws when closed are not held together firmly enough by the rings of the expanded actuator to kill instantly certain animals trapped in the jaws unless these animals are caught in a vulnerable location. Moreover, in such rotating frame traps with square or rectangular frames, at least one of such large rings can, when the actuator is expanded, slide over the right-angled corners of the frame and down onto the frame sides, with the results that the closed jaws of the trap are not held together tightly and the trap becomes cumbersome to open. Another disadvantage in this type of trap has been that the maximum squeeze of the jaws of the trap is attained only when the jaws are completely closed and the actuator rings have extended along the ends of the frames to the fullest extent. With thick-bodied animals or taller animals having larger backbones and bulkier bodies, the maximum squeeze of the jaws is required while the jaws are not as close together as they would be for animals such as mink. When such bulkier animals are caught in such a trap, their bodies often stop the jaws of the trap from completely closing and prevent the actuator rings from extending to the limits of their run along the adjacent end members, thus keeping the trap from attaining maximum squeeze. On the other hand, if the jaws of such a trap are arranged so as to be suitable for the killing of animals with bulky bodies, they are unsuitable for giving instant death to animals with slimmer bodies, which are certain to sometimes be caught in traps set for larger animals.

Despite these shortcomings, however, it should be pointed out that these versions of rotating frame traps nevertheless kill animals more effectively than leghold traps. Most caught animals, for example, die much sooner — some in a manner of minutes — in one of these rotating frame traps than in a leghold trap.

It is an object of the present invention to provide a rotating frame trap which kills desired animals more quickly and humanely than previously known traps with square or rectangular frames. It is a further object of the present invention to provide a rotating frame trap, one size of which, because of its shape, will catch and kill a greater number of species of fur bearing animals than will a single size of previously known traps.

SUMMARY OF THE INVENTION

In order to achieve these and other ends, the rotating frame trap according to the present invention has been constructed with frames having upper ends of substantially greater length than the lower ends. This construction gives the actuator rings a longer run along the upper ends and creates more leverage or squeezing power on the jaws at the narrower portions of the sides where the jaws would close on an animal. In addition, the opposite sides of each frame may be entirely or partly flared away from the axis of rotation in order to provide greater squeezing power of the jaws at the lower portions of the sides. Animals will more readily enter a set trap of this general shape because such a trap, having flared sides, provides a opening which appears more spaceous to animals than an opening of the same area in a rotating frame trap having rectangular or square frames.

Of course, the overall shape and dimensions of the trap frames may be modified to suit the purpose of the trap. When the trap is used with a proper trigger, which insures that an animal will be in a vulnerable position when the trap is sprung, it is preferred that the trap frames are constructed so that one set of jaws closes and crushes the lung and heart regions of the animal while the other set of jaws closes on each side of its neck, regardless of the size of animal caught. (The heart and lung and the neck areas are the most vulnerable parts on an animal's body).

Yet another feature which may be incorporated into the present invention, and which is applicable as well to the earlier rotating frame traps having square or rectangular frames, is a downwardly pointing, wedge-shaped space between at least the upper portions of the jaws when they are in tightly closed position. In other words the upper portions of co-acting jaws maybe outwardly flared away from each other to give a "Y" appearance to each set of closed jaws. This away-from-each-other flare of the jaws together with the resultant wider spacing apart of the corresponding end portions of the adjacent upper frame ends permits using larger actuator rings than were previously possible, and at the same time provides for a very tight and powerful squeeze between the lower portions of the jaws when closed. This squeeze may be made powerful enough to kill mink, and even tight enough to kill very small animals such as weasels and squirrels instantly. This feature of the invention makes it possible for the rings to extend closer to the limit of their run when animals with bulkier bodies are caught. These larger animals naturally have longer legs and are thus caught higher up in the trap where there is a space between the jaws. In addition, since the flared sides meet the upper ends of the frame at an acute angle, such larger actuator rings when sprung, are unable to slide over the corners of the frames. Of course, the larger rings give the jaws greater starting and striking power, resulting in the killing of more animals. In addition, good strong thrust at the start of the closing of the trap can overcome snow, ice crusts, leaves, floating reeds or other debris which act as impediments to slow down a trap's action or even stop it altogether, during ordinary operation and use of a trap on land or in water.

Alternatively, this downwardly pointing wedge-shaped opening between the closed jaws may extend the full length of the jaws to give the jaws the appearance of a narrow "V."

Traps of the present invention are particularly effective against very small, moderately small, or medium sized fur bearing animals, or animals of such sizes which are trapped either for food or as pests.

DESCRIPTION OF THE DRAWING

Some preferred embodiments of the invention will now be described with reference to the accompanying drawings in which, FIG. 1 is a perspective view illustrating a rotating frame trap of the present invention in vertical, set position, FIGS. 2 and 3 are side and top views respectively of the trap frame of FIG. 1 showing the jaws in closed position

DESCRIPTION OF THE PREFERRED EMBODIMENTS

The animal trap illustrated in the drawings consists of two frames 10 and 11, a trigger means indicated generally by 12 and an actuator 13. The frame 11 consists of two sides 14 and 15 which are joined together at one end by a lower frame end which consists of two non-collinear substantially parallel sections 16 and 17 connected by a central pivot section 18. Sides 14 and 15 are joined together at their other end by an upper frame end, substantially longer than the lower frame end, and which consists of two non-collinear, substantially parallel sections 19 and 20 which are connected by a central pivot section 29. Similarly, the frame 10 consists of two sides 22 and 23 which are connected at the one end by a lower frame end which consists of two non-collinear, substantially parallel sections 24 and 25 and a central pivot section 26, (shown in FIG. 2) and which are connected at the other end by an upper frame end substantially longer than the lower frame end and which consists of two non-collinear, substantially parallel sections 27 and 28 connected by a central pivot section 21. Pivot sections 18, 21, 26 and 29 are all centered on a common axis of rotation of the frames. Sides 15 and 22, and sides 14 and 23 each form a pair of co-acting jaws. Actuator 13 co-operates with the adjacent upper frame ends.

Each of sides 14, 15, 22 and 23 is made up of a lower straight portion 30, 31, 32 and 33 respectively, this portion being parallel to the axis of rotation of the frames. Above this portion is a side portion 34, 35, 36 and 37, each such side portion being flared away from the axis of rotation and lying between the respective lower straight portions of the sides and upper ends. The upper portion 38, 39, 40 and 41 of the flared portions 34, 35, 36 and 37 of the sides are also outwardly flared with respect to adjacent sides when the jaws of the trap are closed, as illustrated in FIG. 2, to form a downwardly pointed wedge-shaped opening in the upper portion of each of the jaws. As illustrated in FIG. 2, the remaining lower portions of adjacent sides in the illustrated embodiment are parallel and tightly closed when the trap has been sprung. This embodiment of the invention is ideal for trapping small animals when the trap is set upright in trails through the grass.

Although not shown in drawings, this wedge-shaped opening may, in a further embodiment, extend downwards up to the full length of the jaws of the trap. In this further embodiment, the sides are straight sections joining the shorter lower ends of each frame to the substantially longer upper ends. In this further embodiment, the sides of the wedge may, for optimum results, be at an angle of approximately 6° with respect to each other.

It should be noted that when the trap is in open position, as illustrated in FIG. 1, the portions of lower ends on each frame to one side of the lower pivot sections 18 and 26 are parallel to one another. These parallel portions of the lower ends can grip therebetween a supporting attachment, to one side of the lower pivot means, for holding the trap in a set position. The trap can be readily mounted using such an attachment, for example on floating planks or perpendicular to the trunk of a tree by fixing the attachment thereto. Upon closing of the trap, the lower ends of the frames cease to grip the attachment freeing the trap to fall into the water or down from the tree.

In another embodiment of the present invention, which differs only slightly from the embodiment shown in the drawings, each of the adjacent lower frame ends joining together respective sides of the frame consists of two collinear straight sections connected by a central pivot section. Each frame end thus crosses the other adjacent lower frame end only at the central pivot section.

The trap frames illustrated are of round wire stock.

The dimensions of the frame members and portions thereof may be altered depending upon, for example, the size of animals intended to be caught by the trap or the trigger mechanism used. In a trap intended to catch moderately small animals such as muskrats, mink, marten, skunks, ground-hogs, opossums, snow-shoe rabbits, civet cats and possibly small fishers, the straight, parallel lower side portions forming the narrowest part of the frames are extended upwards from the lower frame ends for a distance of approximately 3 ½ inches. This is the height required to ensure that mink, which are extremely hard to kill, would be caught by the jaws where they deliver their maximum striking and squeezing power. This construction ensures that a tight squeeze is obtained on the small body of the mink, usually caught in the lower portions of the jaws, when the trap is in closed position, since the straight, parallel lower portions of co-acting sides are pressing together with great force. Occasionally, a mink will be caught a little higher up in the trap. For this reason, the jaws can be made to close tightly for an inch or so after they start to flare upwards, as in the illustrated embodiment. Of course, such a trap designed to catch moderately small animals would also be effective in killing very small animals such as weasels and squirrels which might trigger the trap, because of the tight closing of the lower portion of the jaws and the narrow width of the lower portions of the frames.

The above-described wedge-shaped opening between the closed jaws of the trap may be altered in shape depending upon the type and size of animal to be trapped.

When a small animal such as a mink activates the trigger of a trap designed in accordance with the preferred embodiment described herein, its shoulders will normally be above the lower central pivot means of the trap. Thus, as the trap is sprung, and the frames rotate, closing the jaws of the trap, the straight parallel lower portions of one set of jaws will close over the animal's lung and heart regions and the straight parallel lower portions of the other set of jaws will close on each side of the animal's neck. If an animal with longer legs, such as a skunk or a rabbit activates the trigger of such a trap, it will normally be caught in the jaws above the straight, parallel lower portions in the higher, flared, wider part of the trap. However, because of the flare of the sides of the frames, the jaws will close in relatively the same positions on such a larger animal as they would have on the smaller one. Moreover, because of the wedge-shaped opening in the upper portions of the closed jaws, the closed jaws will squeeze together on such bulkier animals caught in this portion of the jaws with a greater force than would have otherwise been the case. Because a larger number of species of fur bearing animals can be caught in each size of trap according to this invention, it follows that fewer trap sizes will be required by a trapper. This will mean a substantial reduction in manufacturing costs to the manufacturer, and inventory costs to the retailer and trapper.

What I claim as my invention is:

1. In an animal trap of the type having two similar frames each having sides serving as jaws and upper and lower ends extending therebetween, and which are pivotally connected through adjacent ends for relative rotation between set and closed positions about a common axis, trigger means for releasably maintaining the trap in set position and an actuator, capable of rapidly and forcefully effecting such rotation upon release of the trigger, having two arms spring biased at one end so that the other ends if unobstructed would move to a distance substantially greater than the width of said frame ends, each arm terminating in a ring respectively adapted to encircle adjacent upper ends of the frames on opposite sides of said axis: the improvement wherein said upper frame ends are of greater length than said lower frame ends and wherein those portions of the jaws of the trap adapted normally to engage an animal are located substantially nearer the axis of rotation than are the points at the extremities of the upper frame ends to which the rings of the actuator run when the trigger is released.

2. In an animal trap of the type having two similar frames each having sides serving as jaws and upper and lower ends extending therebetween, and which are pivotally connected through adjacent ends for relative rotation between set and closed positions about a common axis, trigger means for releasably maintaining the trap in set position and an actuator, capable of rapidly and forcefully effecting such rotation upon release of the trigger, having two arms spring biased at one end so that the other ends if unobstructed would move to a distance substantially greater than the width of said frame ends, each arm terminating in a ring respectively adapted to encircle adjacent upper ends of the frames on opposite sides of said axis: the improvement wherein said upper frame ends are of greater length than said lower frame ends and wherein those portions of the jaws of the trap adapted normally to engage an animal are located substantially nearer the axis of rotation than are the points at the extremities of the upper frame ends to which the rings of the actuator run when the trigger is released and wherein said sides of each frame are flared away from the axis of rotation each side forming an acute angle with the upper frame end to which it is joined.

3. An animal trap according to claim 2 wherein the jaws in pairs of co-acting jaws of the trap are outwardly flared to form a downwardly pointing, wedge-shaped opening between the co-acting jaws when closed thus permitting the use of an actuator having larger rings for a quicker and more powerful closing of the jaws when the trigger is activated.

4. An animal trap according to claim 2 wherein each of said sides comprises a lower portion parallel to the axis of rotation and an upper portion flared away from the axis of rotation, this upper portion forming an acute angle with the upper frame end to which it is joined, thus permitting the use of an actuator having larger rings for a quicker and more powerful closing of the jaws when the trigger is activated.

5. An animal trap according to claim 4 wherein the upper flared portions of sides forming pairs of co-acting jaws are outwardly flared to form a downwardly pointing, wedge-shaped opening between upper portions of the coacting jaws when the jaws are in closed position.

6. An animal trap according to claim 5 wherein said outward flare of said jaws to form a downwardly pointing, wedge-shaped opening in the upper portion of each of the closed jaws is in the upper portion of said upper flared portions of said sides.

7. An animal trap according to claim 6 wherein said lower portion of each of said sides parallel to the axis of rotation is about 3 ½ inches long.

* * * * *